United States Patent [19]

Tolmie, Jr.

[11] 4,361,798

[45] Nov. 30, 1982

[54] SYSTEM FOR EXTENDING THE VOLTAGE RANGE OF A PHASE-FIRED TRIAC CONTROLLER

[75] Inventor: Robert J. Tolmie, Jr., Brookfield Center, Conn.

[73] Assignee: Pitney Bowes Inc., Stamford, Conn.

[21] Appl. No.: 200,823

[22] Filed: Oct. 27, 1980

[51] Int. Cl.³ ............................................. G05F 1/455
[52] U.S. Cl. ................................. 323/324; 307/252 B; 307/311
[58] Field of Search ....................... 323/239, 324, 327; 307/252 B, 252 N, 252 A, 324

[56] References Cited

U.S. PATENT DOCUMENTS

| | | | |
|---|---|---|---|
| 3,332,000 | 7/1967 | Greening et al. | 363/54 |
| 3,594,591 | 7/1971 | Laupman | 307/252 B |
| 3,816,763 | 6/1974 | Korn et al. | 307/252 B |

Primary Examiner—William H. Beha, Jr.
Attorney, Agent, or Firm—Peter Vrahotes; William D. Soltow, Jr.; Albert W. Scribner

[57] ABSTRACT

A phase-fired triac controller used to control the supply of voltage to a load. A system has been devised that controls the level of voltage at the gate triac to avoid breakdown of this element.

2 Claims, 2 Drawing Figures

SYSTEM FOR EXTENDING THE VOLTAGE RANGE OF A PHASE-FIRED TRIAC CONTROLLER

BACKGROUND OF THE INVENTION

One of the common ways for controlling the power to a load is to couple an optically coupled isolator to a load triac, the load triac serving the function of a switch between a source of AC power and the load. A device such as a phototriac is coupled to the gate of the load triac and functions rapidly to serve as a switch and give isolation. In prior art designs, the same AC power source that is connected to the load triac is also connected to the gate triac. With presently commercially available components, a gate triac is capable of operating at a voltage of 115 volts or less. When larger voltages are used, such as 220, there is a tendency for the gate triac to experience voltage breakdown. Previous attempts to overcome this problem involved putting two gate triacs in series with one another to reduce the effect of voltage. This proved unsatisfactory.

DESCRIPTION OF THE INVENTION

A phase-fired triac controller circuit has been devised so that the gate triac will not experience a breakdown even though the line power may have a voltage in excess of the tolerance for the gate triac. This is accomplished by dividing the voltage to the gate triac with resistors and by using a capacitor and resistor to supply the gate current required by the load triac.

DETAILED DESCRIPTION OF THE PREFERRED EMBODIMENT

Figure 2:
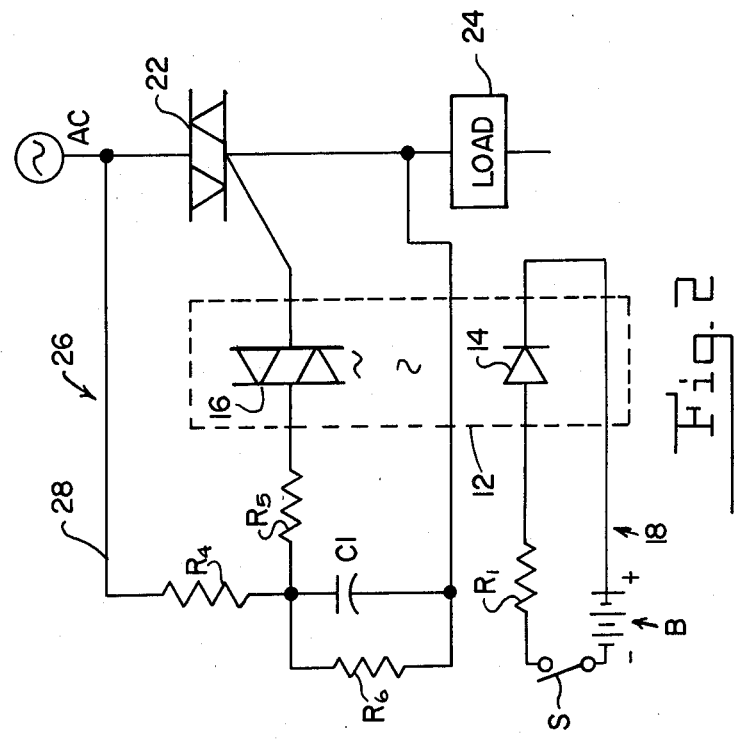
FIG. 2 is a schematic diagram of a phase-fired triac controller that incorporates circuit that utilizes the instant invention.
Figure 1:
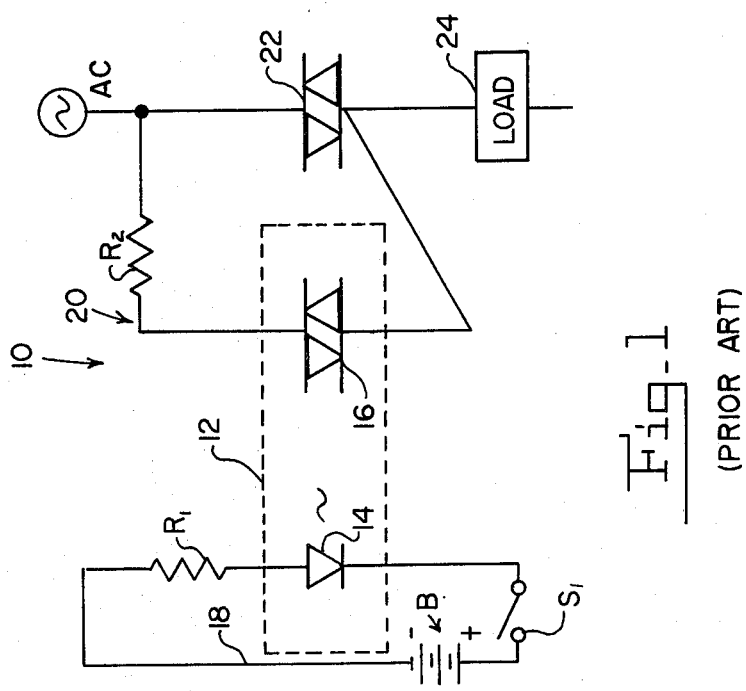
FIG. 1 shows a schematic diagram of a circuit that represents a prior art phase-fired triac controller circuit.

In FIGS. 1 and 2 of the drawing, the same numbers are used to identify identical parts. Referring to FIG. 1, a phase-fired triac controller circuit of the prior art type is shown generally at 10 and includes an optically coupled isolator 12 that is made up of a light emitting diode 14 and a phototriac 16. The light emitting diode 14 has a circuit 18 which includes a source of power, such as a battery B, a switch S1 and a resistor R1 so that the light emitting diode may be selectively enabled by closing the switch S1. The triac 16 has a circuit 20 which is connected to a source of AC power through a resistor R2 and is coupled to a load triac 22, which load triac is coupled to the load 24. The load 24 may be a lamp for a copy machine or any other device requiring high voltage. As can be seen in this prior art device 10, the voltage supplied to the phototriac 16 is the full line voltage. When the AC source is too great, the phototriac 16 will experience a breakdown.

Referring now to FIG. 2, a phase-fired triac controller 26 using the principles of the instant invention is shown generally at 26. As in the prior art device 10, the phase-fired controller 26 utilizes an optically isolated device 12 having a light emitting diode 14 and a phototriac 16. The light emitting diode 14 also has a circuit 18 with a source of power, such as a battery B, a resistor R, and a switch S so as the diode 14 may be selectively enabled to give off light to the phototriac 16. The phototriac 16 is coupled to the gate of a load triac 22, there being a source of AC power connected to the load triac 22 and to a level 28 that is coupled to the phototriac 16. The lead 28 includes a resistor R4 and a capacitor C1 that are in series with one another, the capacitor C1 being coupled to the output of the load triac 22. A resistor R5 is coupled to the phototriac 16 and to the capacitor C1 and resistor R4. A resistor R6 is in parallel with the capacitor C1. With this combination, the amount of voltage supplied to the gate of the triac 16 may be substantially reduced whereas the voltage supplied to the load triac 22 remains high. This is accomplished through selection of the resistors R4 and R6. By proper selection of these resistors R4 and R6, the voltage may be divided in half so that a 220 volt input would be reduced to 110 volts, which is in the tolerance range of the phototriac 16. The resistor R5 sets the current level going into the gate triac 6. The resistors R4, R5 and the capacitor C1 also slow down the rate of voltage rise (dv/dt) to the gate triac 16 preventing it from turning on and consequently preventing the load triac from turning on.

What I claim is:

1. In a system for controlling voltage to a load, the combination comprising:
    an optically coupled isolator including a light emitting diode and a phototriac spaced relative to said diode;
    means for enabling said light emitting diode whereby said phototriac is enabled thereby;
    a load triac coupled to said phototriac and connected to the load;
    an AC source coupled to said load triac and to said phototriac, and
    means for reducing the voltage supplied from said AC source to said phototriac while substantially allowing the original level of the voltage from the AC source to the load triac, comprising first and second resistors connected in series between said AC source and said phototriac, and a capacitor connected between said first and second resistors and the output of said load triac.

2. The system of claim 1 including a third resistor connected in parallel with said capacitor.

* * * * *